United States Patent Office 3,354,236
Patented Nov. 21, 1967

3,354,236
BUTENE PRODUCTION
Harvey S. Klein, Berkeley, Calif., assignor to Shell Oil Company, New York, N.Y., a corporation of Delaware
No Drawing. Filed Apr. 24, 1967, Ser. No. 632,900
6 Claims. (Cl. 260—683.15)

ABSTRACT OF THE DISCLOSURE

The dimerization of ethylene to n-butenes in a nonpolar hydrocarbon reaction medium in the presence of a palladium halide catalyst is improved by the additional presence of an organic sulfone co-catalyst.

Background of the invention

The conversion of ethylene to higher molecular weight products in the presence of palladium compounds is known in the art. U.S. Patent No. 3,013,066 of Alderson, issued Dec. 12, 1961, discloses the dimerization of ethylene in hydroxylic media in the presence of palladium chloride. U.S. Patent No. 2,656,398 of De Vault, issued Oct. 20, 1953, discloses the dimerization of ethylene in a heterogeneous process in the presence of a palladium oxide catalyst on a porous siliceous base. Van Gemert and Wilkinson disclose in J. Phys. Chem., 68, 645 (1964), the dimerization of ethylene in nonhydroxylic media in the presence of bis(ethylene)dichloro-$\mu$-dichloropalladium $(PdCl_2C_2H_4)_2$. U.S. patent application of Kohll et al., Ser. No. 373,508, filed June 8, 1964, discloses the dimerization of ethylene in the presence of palladium halide catalysts and organic nitro compounds.

Each of these aforementioned processes for the dimerization of ethylene to n-butenes has inherent disadvantages. For example, the dimerization process of Alderson requires temperatures of 130° C. to 225° C. to bring about reaction at a reasonable rate and gives about a 50% yield of higher molecular weight products which contain only minor amounts of useful higher olefins, e.g. hexenes and octenes. The process of De Vault produces only about 10% by weight of higher molecular products; however, it has the additional disadvantage of requiring extensive catalyst pretreatment, e.g., the impregnation of a palladium oxide catalyst on a catalyst carrier, for example by the lengthy process of impregnating a carrier with a palladium salt, reducing the salt to produce a palladium-impregnated carrier, and subsequently oxidizing the palladium to the oxide by heating to between 450° C. and 650° C. Although the method described by Van Gemert and Wilkinson accomplishes the dimerization of ethylene to n-butenes with 90% to 100% selectivity, the method suffers as the result of the unstable character of the $(PdCl_2C_2H_4)_2$ catalyst used, e.g., decomposition at temperatures near 50° C., and hence the requirement that the dimerization reaction be conducted at or about room temperature with a concomitant slow rate of ethylene conversion. In general, the process of Kohll appears to overcome certain of the limitations of the aforementioned processes but suffers from the requirement of an organic nitro compound, especially in the preferred embodiments of the process which contemplate the use of the nitro compounds in substantial excess as the solvent. For the most part organic nitro compounds are highly toxic and difficult to handle, primarily because of their unusually high vapor pressures. Even those compounds with lower vapor pressures are hazardous because they are absorbed readily through the skin.

Summary of the invention

It has now been found that the dimerization of ethylene to n-butenes with the exclusion of higher molecular weight product is accomplished under relatively mild conditions in nonpolar hydrocarbon solvents in the presence of a palladium halide catalyst and an organic sulfone co-catalyst. In addition to facilitating the exclusive formation of n-butenes, the presence of catalytic amounts of an organic sulfone accelerates the rate of ethylene conversion to such an extent that the dimerization reaction is efficiently carried out at temperatures of about 70° C. in nonpolar hydrocarbon solvents.

Description of preferred embodiments

The catalyst employed in the process of the invention is a palladium halide, that is, a compound of the formula $PdX_2$ wherein X is halogen. Although palladium halides wherein the halogen is fluorine or iodine are in part operable, better results are obtained where the catalyst is a palladium halide of halogen of atomic number from 17 to 35 inclusive, that is, the middle halogens, chlorine and bromine. Particularly preferred as catalyst is palladium chloride, $PdCl_2$.

The palladium halide is employed in catalytic quantities. Molar ratios of palladium halide to ethylene of from about 1:10 to about 1:10,000 are satisfactory, with molar ratios of about 1:100 to about 1:1,000 being preferred.

The efficiency of the process depends on the use of an organic sulfone, as defined hereinbelow, as co-catalyst in conjunction with the palladium halide catalyst in proportions at least equimolar to the palladium halide. Molar ratios of organic sulfone to palladium halide as high as about 20:1 are satisfactory, but the use of too great an excess, e.g., as by the use of the organic sulfone as a sole solvent, is detrimental to the process of the invention. Generally, the preferred molar ratio of organic sulfone to palladium halide is from about 1:1 to about 10:1.

Organic sulfone compounds of from 2 to 20 carbon atoms having at least one sulfone moiety are generally suitable for use as co-catalysts in the process of the invention. Although it should be appreciated that an organic sulfone compound containing non-interfering substituents such as halogens, amino groups, ether groups or ester groups is useful, largely for economic reasons the preferred sulfones are hydrocarbon sulfones, that is, sulfones containing only carbon and hydrogen other than the sulfur and oxygen atoms of the —$SO_2$— group.

One group of organic sulfones suitable for use in the process of the invention are hydrocarbon sulfones represented by the formula $RSO_2R$ wherein R independently is a hydrocarbyl group preferably of from 1 to 10 carbon atoms with the proviso that the R's taken together may be a divalent hydrocarbyl radical which together with the sulfur atom forms an otherwise carbocyclic ring system of a cyclic sulfone, e.g., sulfolane. R independently is aliphatic, cycloaliphatic or aromatic preferably free from acetylenic unsaturation. When aliphatic, R is straight-chain or branched-chain in configuration, and is saturated or olefinically unsaturated, but preferably is free from acetylenic unsaturation. The suitable hydrocarbyl R groups; the cyclopentyl, cyclohexyl and like cycloalkyl aryl, aralkyl and alkaryl. Illustrative examples include the methyl, ethyl, and n- and isopropyl groups, the various isomeric butyl, pentyl, hexyl, octyl, and like alkyl groups; the cyclopentyl, cyclohexyl and like cycloalkyl groups; the vinyl, isopropenyl, 1-butenyl and like alkenyl groups; the cyclopentenyl group; phenyl, naphthyl and like aryl groups; the benzyl, phenylethyl, p-methylbenzyl, and like aralkyl groups; and the isomeric xylyl groups, ethylphenyl, p-tolyl and like alkaryl groups.

In those sulfones wherein the R's represent a divalent radical, it is preferred that the divalent radical is a group with from 4 to 5 carbon atoms in the chain thereof, as in the tetramethylene and pentamethylene groups.

Illustrative hydrocarbyl sulfones represented by $RSO_2R$ wherein each R is monovalent include sulfones such as dimethyl sulfone, ethyl isopropyl sulfone, ethyl isobutyl sulfone, isopropentyl, ethyl sulfone, phenyl methyl sulfone, phenyl 1-butenyl sulfone, α-naphthyl isopropyl sulfone, dibenzyl sulfone, phenylethyl isobutyl sulfone, benzyl phenyl sulfone, p-tolyl ethyl sulfone and illustrative sulfones wherein the R's together form a divalent radical include sulfones such as sulfolane (tetramethylenesulfone), α-methyltetramethylenesulfone, sulfolene, pentamethylenesulfone and α,β-dimethyltetramethylenesulfone. Particularly preferred are sulfolane and phenyl 1-butenyl sulfone.

The process of the invention is preferably conducted in the liquid phase in nonpolar hydrocarbon diluents which are liquid at reaction temperature and pressure and are inert to the reactants as well as the products. Illustrative hydrocarbon diluents include saturated aliphatic and cycloaliphatic hydrocarbons such as heptane, isooctane, cyclohexane, methylcyclopentane and aromatic hydrocarbons such as benzene, toluene, and the isomeric xylenes. A particularly preferred class of diluents for use in the process of the invention comprises the aromatic hydrocarbons, especially benzene.

The amount of hydrocarbon diluent employed is not critical and molar ratios of diluent to total reactants of from about 1:5 to about 20:1 are satisfactory.

The dimerization of ethylene is conducted by any of a variety of procedures. In one modification, the entire amounts of the reaction mixture components are charged to an autoclave or similar pressure reactor for operation in a batchwise manner. In a similar batchwise modification the ethylene is added to the remaining reaction mixture components in increments. In yet another modification, reaction is effected in a continuous operation as by contacting the ethylene, catalyst, co-catalyst and diluent during passage through a tubular reactor. In any modification, the reaction is conducted at elevated temperature. Suitable reaction temperatures vary from about 40° C. to about 120° C. with best results being obtained through utilization of reaction temperatures from about 50° to about 100° C. The reaction is conducted under pressure in order to maintain the normally gaseous ethylene in the liquid phase at elevated reaction temperatures. Typical reaction pressures are from about 150 p.s.i.g. to about 1000 p.s.i.g. although reaction pressures from about 300 p.s.i.g. to about 800 p.s.i.g. are preferred.

Subsequent to the reaction, the reaction mixture is separated by conventional means such as fractional distillation, selective extraction, and the like. The butene product comprises a mixture of 1-butene, cis-2-butene and trans-2-butene. Although the composition of the 1-butene and 2-butene isomers in the product mixture depends in part on the reaction conditions, e.g., temperature and pressure, the product normally consists of at least 95% cis- and trans-2-butene with only minor amounts of 1-butene being observed.

The 1-butene and 2-butene products of the process of the invention have established utility as precursors of polymers and copolymers. Solid high-molecular weight polymers of 2-butene are produced by catalyst compositions comprising $TiCl_3$-$AlCl_3$-NaH compounds, as disclosed by U.S. Patent No. 2,956,989, issued Oct. 18, 1960, to Jezl. Copolymers of 1-butene or 2-butene with ethylene are produced by catalyst systems comprising alkali metals and alkali metal hydrides, as disclosed by U.S. Patent No. 2,881,234, issued Apr. 7, 1959, to Esmay et al. or by $SiO_2$-$Al_2O_3$-$ZrO_2$ compounds, as disclosed by U.S. Patent No. 2,921,872, issued Jan. 19, 1960, to McGlamery. Copolymers of 2-butene with butadiene or isoprene are produced with catalyst compositions comprising sodium compounds, as disclosed by German Patent No. 1,093,094, issued Nov. 17, 1960, to Hedman et al.

The n-butenes also have established utility for production of many organic chemicals of commerce. For example, butadiene is produced by the catalytic dehydrogenation of n-butenes in the presence of catalyst compositions comprising $Fe_2O_3$ and $K_2O$ as disclosed by U.S. Patent No. 2,426,809, issued Sept. 2, 1947, to Kearby and by U.S. Patent No. 2,414,585, issued Jan. 21, 1947, to Eggertsen et al. The dehydrogenation of n-butenes to butadiene is also carried out in the presence of halogens as disclosed by U.S. Patent No. 3,303,234, issued Feb. 7, 1967, to Bajars et al. and in the presence of catalyst compositions comprising $Fe_2O_3$, $K_2O$, and $Cr_2O_3$ as disclosed by U.S. Patent No. 2,971,926, issued Feb. 14, 1961, to Stillwell. The oxidation of 2-butene to butene glycol and butene oxide in the presence of Co or Ni supported on $SiO_2$ or $Al_2O_3$ is disclosed by U.S. Patent No. 2,974,161, issued Mar. 7, 1961, to Keith et al. German Patent No. 944,948 of Standard Oil Development Co., issued June 28, 1956, discloses the oxidation of 2-butene in the presence of a Mo-V oxide catalyst to maleic acid.

To further illustrate the improved process of the present invention, the following examples are provided. It should be understood that they are not to be regarded as limitations, as the teaching thereof may be varied as will be understood by one skilled in this art.

*Example I*

To an autoclave was charged 18 g. of ethylene, 0.5 g. of palladium chloride, 1.0 g. of sulfolane and 20 ml. of benzene, and the mixture was maintained for 18 hours at a temperature of 75° C. and a maximum pressure of 750 p.s.i.g. Gas-liquid chromatographic analysis of the reaction product showed that there was an 80% conversion of ethylene to a mixture consisting of 2% 1-butene, 28% cis-2-butene and 70% trans-2-butene. No higher molecular weight oligomers of ethylene were observed.

*Example II*

To illustrate that the presence of an organic sulfone results in an acceleration of the rate of ethylene conversion in addition to bringing about the exclusive formation of n-butenes, comparative experiments were performed in the absence and in the presence of an organic sulfone. Thus, by a procedure similar to that of Example I, a mixture of 1.0 g. of phenyl 1-butenyl sulfone, 0.5 g. of $PdCl_2$ and 20 ml. of benzene was charged to an autoclave. The autoclave was then pressured to 760 p.s.i.g. with ethylene and maintained at a temperature of 70° C. After a period of 104 minutes, the conversion of ethylene was 50%. In a similar experiment under identical conditions, except in the absence of an organic sulfone, the conversion of ethylene after 104 minutes was 13.8%.

I claim as my invention:
1. In the process of dimerizing ethylene to n-butenes in the liquid phase in the presence of palladium halide catalysts, wherein the molar ratio of palladium halide to ethylene is from 1:100 to 1:1,000, at a pressure of 150 p.s.i.g. to 1,000 p.s.i.g. and at a temperature of 40° C. to 120° C., the improvement which comprises conducting the dimerizing in the presence of an added organic sulfone co-catalyst wherein the molar ratio of added organic sulfone to palladium halide is from about 1:1 to about 10:1, said organic sulfone being represented by the formula $RSO_2R$ wherein R independently is a hydrocarbyl group of from 1 to 10 carbon atoms with the proviso that the R's taken together in combination are a divalent radical which together with the sulfur atoms forms a cyclic sulfone.

2. The process of claim 1 wherein the palladium halide is palladium chloride.

3. The process of claim 2 wherein each R group of $RSO_2R$ is monovalent.

4. The process of claim 3 wherein $RSO_2R$ is phenyl 1-butenyl sulfone.

5. The process of claim 2 wherein the R's of $RSO_2R$ are a divalent radical.

6. The process of claim 5 wherein $RSO_2R$ is sulfolane.

References Cited

UNITED STATES PATENTS

| | | | |
|---|---|---|---|
| 2,085,535 | 6/1937 | Langedijk et al. | 260—683.15 |
| 3,013,066 | 12/1961 | Alderson | 260—683.15 X |

FOREIGN PATENTS

| | | |
|---|---|---|
| 887,362 | 1/1962 | Great Britain. |

PAUL M. COUGHLAN, Jr., *Primary Examiner.*